United States Patent [19]

Liaguno et al.

[11] Patent Number: 5,729,741
[45] Date of Patent: Mar. 17, 1998

[54] SYSTEM FOR STORAGE AND RETRIEVAL OF DIVERSE TYPES OF INFORMATION OBTAINED FROM DIFFERENT MEDIA SOURCES WHICH INCLUDES VIDEO, AUDIO, AND TEXT TRANSCRIPTIONS

[75] Inventors: Anthony Shawn Liaguno, Melbourne Beach; Andrew Frank Connor, Melbourne, both of Fla.

[73] Assignee: Golden Enterprises, Inc., Melbourne, Fla.

[21] Appl. No.: 419,152

[22] Filed: Apr. 10, 1995

[51] Int. Cl.$^6$ ...................................................... G06F 17/30
[52] U.S. Cl. .................. 395/615; 395/2.79; 395/603; 395/606; 395/612; 395/617; 364/551.01; 364/282.1
[58] Field of Search .................. 364/900, 419, 364/518, 283.2, 514 R, 401, 551.01; 395/600, 147, 200, 615, 603, 154, 106, 508, 605, 208, 796, 761, 604, 2.79, 612, 617; 341/67; 382/36, 61, 317, 175; 340/995; 434/118

[56] References Cited

U.S. PATENT DOCUMENTS

| | | | |
|---|---|---|---|
| 4,213,189 | 7/1980 | Mueller et al. | 395/526 |
| 4,278,838 | 7/1981 | Antonov | 395/2.69 |
| 4,554,631 | 11/1985 | Reddington | 364/283.2 |
| 4,566,065 | 1/1986 | Toth | 395/2.6 |
| 4,635,136 | 1/1987 | Ciampa et al. | 386/64 |
| 4,695,975 | 9/1987 | Bedrij | 395/807 |
| 4,741,045 | 4/1988 | Denning | 382/178 |
| 4,858,170 | 8/1989 | DeWick, Sr. et al. | 395/796 |
| 4,924,387 | 5/1990 | Jeppesen | 395/208 |
| 4,941,125 | 7/1990 | Boyne | 395/615 |
| 4,965,744 | 10/1990 | Wagatsuma et al. | 395/109 |
| 4,985,863 | 1/1991 | Fujisawa et al. | 395/605 |
| 5,016,007 | 5/1991 | Iihoshi et al. | 340/995 |
| 5,016,009 | 5/1991 | Whiting et al. | 341/67 |
| 5,019,905 | 5/1991 | Pshtissky et al. | 348/159 |
| 5,099,422 | 3/1992 | Foresman et al. | 395/201 |
| 5,129,061 | 7/1992 | Wang et al. | 395/118 |
| 5,159,667 | 10/1992 | Borrey et al. | 395/761 |
| 5,172,281 | 12/1992 | Ardis et al. | 360/72.2 |
| 5,201,011 | 4/1993 | Bloomberg et al. | 382/175 |
| 5,218,673 | 6/1993 | Fujiwara | 395/508 |
| 5,235,654 | 8/1993 | Anderson et al. | 382/180 |

(List continued on next page.)

OTHER PUBLICATIONS

Miale, Nicole "Computer Talk 101: Software–Based Text–To–Speech Gives Developers New Options", Teleconnect, v12, n5, p72(7), May 1994.

Banet, Bernard "Speech to Text: Dicatation Systems from IBM, Dragon Systems", The Seybold Report on Desktop Publishing, v8, n7, p3(9), Mar. 7, 1994.

Eliot, Lance B. "In Very Good Form", AI Expert, v9, n7, p9(3), Jul. 1994.

(List continued on next page.)

*Primary Examiner*—Thomas G. Black
*Assistant Examiner*—Charles Leon Rones
*Attorney, Agent, or Firm*—Charles E. Wands

[57] ABSTRACT

An integrated media image information storage and retrieval system processes information supplied by different types of media. A processor-based network server operates as a system interface between one or more user control terminals, a media image capture station through which media image input/output devices are coupled to the network server, and a memory for storing media image files to be retrieved for reproduction. A supervisory media image manipulation and control program is accessed through a supervisory graphical user interface at any user control terminal, and has embedded subordinate media image manipulation programs for different types of media and information formats. When using the interface to import information from an arbitrary medium, the user is able to generate a first, index storage file, and a supplemental text description-based file, so as to facilitate rapid retrieval of any type of data, regardless of its original format (e.g. text, picture, text-picture combination, video, audio) and regardless of the capture medium or source from which it is imported into the system.

12 Claims, 3 Drawing Sheets

U.S. PATENT DOCUMENTS

| | | | |
|---|---|---|---|
| 5,241,671 | 8/1993 | Reed et al. | 395/615 |
| 5,303,148 | 4/1994 | Mattson et al. | 128/660.01 |
| 5,305,396 | 4/1994 | Betts et al. | 382/175 |
| 5,350,303 | 9/1994 | Fox et al. | 434/118 |
| 5,369,704 | 11/1994 | Bennett et al. | 380/9 |
| 5,388,197 | 2/1995 | Rayner | 395/328 |
| 5,404,295 | 4/1995 | Katz et al. | 395/602 |
| 5,404,435 | 4/1995 | Rosenbaum | 395/777 |
| 5,414,644 | 5/1995 | Seaman et al. | 364/551.01 |
| 5,418,948 | 5/1995 | Turtle | 395/604 |
| 5,434,933 | 7/1995 | Karnin et al. | 382/317 |
| 5,444,615 | 8/1995 | Bennett et al. | 395/208 |
| 5,467,288 | 11/1995 | Fasciano et al. | 364/514 R |
| 5,493,677 | 2/1996 | Balogh et al. | 395/615 |
| 5,500,920 | 3/1996 | Kupiec | 395/2.79 |
| 5,511,148 | 4/1996 | Wellner | 395/106 |
| 5,517,605 | 5/1996 | Wolf | 395/615 |
| 5,528,732 | 6/1996 | Klotz, Jr. | 395/106 |
| 5,544,352 | 8/1996 | Egger | 395/605 |

OTHER PUBLICATIONS

Lane, Alex "Store–Bought Recognition Tools", v9, n10, p11(3), Oct. 1994.

Dyson et al. "Macworld, Part II: Image Processing, Scanners, Printers, Utilities, etc.", The Seybold Report on Desktop Publishing, v9, n1, p27(7), Sep. 12, 1994.

Chen et al. "Word Spotting in Scanned Images Using Hidden Markov Models", ICASSP '93: Acoustics Speech and Signal Processing Conference, p.v1–v4, Apr. 1993.

Lopresti, Daniel P. "Robust Retrieval of Noisy Tex", ADL '96 Forum on Research and Technology, p.76–85, Apr. 1996.

SYSTEM FOR STORAGE AND RETRIEVAL OF DIVERSE TYPES OF INFORMATION OBTAINED FROM DIFFERENT MEDIA SOURCES WHICH INCLUDES VIDEO, AUDIO, AND TEXT TRANSCRIPTIONS

FIELD OF THE INVENTION

The present invention relates in general to information storage and retrieval systems, and is particularly directed to a new and improved system for efficiently storing multiple types of media image information, including but not limited to text, still images, animation, graphics, video, and audio, derivable from a variety of media image sources, such as computer data base files, hard copy print media, photographs, audio cassettes, video camera, etc., and also rapidly accessing any piece of media image information for reproduction on an output device, such as a user display terminal or printer.

BACKGROUND OF THE INVENTION

Continuing improvements in information gathering and processing technology have made it possible for industries and professions to avail themselves of a variety of media and associated storage and reproduction equipment. For example, in the legal profession, access to information stored on multiple and diverse types of media is crucial to research, the generation and storage of documents, and the gathering and evaluation of evidence. Also, success at trial often depends upon the ability of the presenting attorney to quickly locate and reproduce a critical piece of evidence, from what is typically a diverse collection of very large quantities of material, including, but not limited to, hard copy (paper documents, such as contracts, receipts, letters, manuscripts, etc.), photographs, audio and video storage media, and computer-accessible storage media.

In order to facilitate this information accessing task, one or more electronic information storage and retrieval devices, such as document scanners, opto-electronic image digitizers, large screen displays and the like, that allow substantially any piece of information, regardless of its original physical characteristics, to be stored and retrieved in an efficient and organized manner, have become commonplace pieces of courtroom equipment. However, because the format of the information stored in one type of database for playback by an associated reproduction device is not necessarily compatible with the format used by another data base and its associated playback device, accessing different pieces of information for presentation to a viewer currently requires the use of a number of separate, stand alone equipments, each of which has its own control software.

For example, the format of a text database file, such as that of a contract or will, derived from an opto-electronic scanner, is not customarily compatible with the format of a still image or dynamic image database file, such as one derived from a digitized photograph, computer graphics image animation, or digitized imagery data frame from a video camera. As a consequence, the process of retrieving diversely formatted electronically stored information is a cumbersome and time-consuming one, requiring the use one or more separate software packages for each media and information type in the course of operating the appropriate storage and retrieval device, to enable the information to be accessed and reproduced.

This problem is exacerbated when the imagery information of interest has been captured on video tape, since locating a given scene or image clip on video tape often entails a repetitive series of fast forward, look, and rewind operations of a video cassette recorder (VCR). Even when equipped with a mechanism for providing a time line index of respective frames scenes on video tape, there is still the need to wait while the VCR physically transports the tape from one clip location to another.

One way to solve this problem is to transfer the imagery information stored on video tape to a faster access, mass storage medium, such as a laser platter or disc (CD-ROM). However, because a laser recording medium is a write once storage device, then whenever it is desired to modify or update any of the stored information, it is necessary to both 'burn' a new laser disc or platter and also enter new parameter data employed in the access and playback control software of the reproduction device, since the location where the information was stored on the previous medium has changed on the new medium as the result of the update.

Thus, even though there exist various storage media and access devices for autonomously electronically storing and reproducing multiple forms of media image information, to date there has been no single or unitary system for integrating diverse pieces of information sourcing, storage and playback equipment and in a manner that allows any piece of information, irrespective of its original format and medium in which it is supplied to the user, to be stored in a manner that allows it to be expeditiously located in a storage database, retrieved and played back on an image reproduction device.

SUMMARY OF THE INVENTION

In accordance with the present invention, the above problem is successfully addressed by a new and improved information storage and retrieval system, which employs a graphical user interface through which data obtained from diverse types of media image generation equipments is converted to both a user-defined storage index format and a supplemental text description-based format, that facilitates rapid retrieval of any type of data, regardless of its original format (e.g. text, picture, text-picture combination, video, audio) and regardless of the capture medium or source from which it is imported into the system.

The overall system architecture of the storage and retrieval system of the present invention includes a processor-based network server, which operates as a system interface between one or more user control terminals, a variety of media image input/output devices and an attendant mass media image store. The fundamental media image input/output control mechanism of the system is performed through one or more local view stations, through which users of the system may control the operation of the network server, for storing and/or retrieving media images to be displayed, exported or printed.

Each view station may comprise a processor-based video display terminal having a keyboard/mouse arrangement, and an associated display device, and interfaces with the network server via a local area network bus. The operational control program for each media image view station includes a supervisory media image manipulation and control program, into which subordinate media image manipulation programs for use with various media and media image formats are embedded, so that a view station user may operate a variety of media image processing programs through a single, supervisory graphical user interface. Such subordinate embedded programs include a media image file annotation program that allows the user to mark-up/edit documents, an image indexing program for indexing a media image and performing a free text search, and a multiple object file viewer for importing images having different formats from various media image sources.

In order to import and store media images from different media, the network server is coupled to a processor-based view/scan/capture station, which is interfaced with a plurality of information sources, such as a digitizing document scanner, an audio input unit, a video camera and an auxiliary input device. Like the other media image processing software, each of the media image capture programs employed by the view/scan/capture station is accessible through the supervisory program of the user view stations.

The audio input may be derived from a microphone associated with video camera and is processed by a voice recognition and text conversion correlation operator to provide a search and identification mechanism for rapidly locating image clips in video data generated by the video camera. When voice from a video camera microphone is imported, the voice/speech signals are processed through a voice recognition-to-text translation routine, so as to generate a 'voice-text' file.

The network server is further coupled to a print/fax station, which is interfaced with a printer and an external communications link (telephone line) through which database-sourced media image files may be imported to and exported from the network server. Imported video data is stored in an attendant mass data store, such as a multi-gigabyte memory. The network server is further coupled to an object server, which controls access to all the other media type on the system.

Irrespective of their type or original data format, all media inputs to the system are processed by means of a text-generator in order to create a 'text' file for that media image. The generation of a text version of each media image enables the use of a free text search operator to locate any media image file. The free text search mechanism program may comprise an indexing and text search program, through which a user at a view station may perform a free text search using Boulean and fuzzy logic parameters. By virtue of the fact that each stored media image file, regardless of its original format, is processed to generate an accompanying text file, then in the event the view station operator lacks a priori knowledge of an index search folder and its attendant description fields. He may still be able to retrieve the media image using the free text operator, since the text file and base file are stored together in association with the index search folder for the media image of interest.

Since any text-containing document may include, in addition, to standard typed or printed text, other 'text'-type marks, such as a date stamp, signatures, hand notations etc., any scanned document scanned is processed through an optical character recognition operator program, so that the resulting text file for the media image of interest will include not only standard typed or printed text, but all text-type markings on the document being scanned. For general media image inputs, such as a photograph, the output of a video camera, or voice input, precursor text-detection processing of the original information signals is also performed to produce a 'text' image file, and thereby allow use of a free text search mechanism.

For speech/voice signals, such as those provided by a microphone associated with the video camera, in addition to generating a base media image file that corresponds to a digitized representation of the original voice signals, the voice signals are also processed through a precursor voice recognition-to-text translation routine, so as to produce an auxiliary base 'text image' file, similar to that obtained by the high speed scanner.

For general, non-text image media, such as photographs, the original media image scene may or may not contain a text object that can be detected by processing the media image through a character recognition routine. To determine whether an original media image contains any text, the base media image derived from the image-containing medium is subjected to a an optical character recognition text conversion operator. This precursor text conversion operator examines the contents of the base media image file, which is a digitized pixel map representation of the original scene and, using a character recognition routine, searches the digitized media image file for the presence of text anywhere in the media image, thereby creating a secondary, 'text' file for that media image.

Once a general media image has been imported, that media image will have two associated media image files. The first is a base media image file obtained as a direct result of the digitizing process carried out by the media image import mechanism. The second is a text media image file, resulting from the precursor text detection operator carried, and contains whatever text, if any, is found in the original media image.

Advantageously, the manner in which imported media images are processed for storage in accordance with the present invention allows two alternative retrieval routines to be used to access a stored media image for playback. The first retrieval routine, termed an index search, relies upon the ability of the user to access folder and descriptor fields within the folder where the media image has been filed. The second, free text search is intended to be used when the user does not have sufficient a priori information to access the folder and descriptor fields within the folder where the media image has been filed. Instead, it relies upon the contents of the text image file associated with the media image to be retrieved.

In accordance with the index search storage routine, using an archival document storage and retrieval graphical user interface program, and the view station keyboard and mouse devices, the user either opens a new folder or opens an already existing folder in which one or more media images may be filed. For each media image being stored within the folder, the user enters various identification information, including media image topic and a media image file description. The media image index file also includes a description field, termed a 'key word' index field. The purpose of the key word index field is to provide a relatively concise description of the media image, that facilitates an index search by a user, and expedites retrieval of the media image by the free text search mechanism, when a user lacks sufficient information to open the folder in which the media image file is stored.

Even though the key word index field can be prepared by the user directly from keyboard of the view station, it is cumbersome, time consuming and relies upon the expertise of the terminal operator to select the appropriate key words. Pursuant to the present invention, the contents of the key word index field are initially generated by a default, non-essential word extraction subroutine, that derives the key words of the key word index field from the contents of the text file. According to this key word field-generation subroutine, as each 'text' image file is generated, it is subjected to a non-essential word extraction operation, which reduces the contents of the media image's text file to one or more 'key words', that are loaded into the key word index field, but contain no auxiliary or connecting words, such as definite or indefinite articles, prepositions and other similar textual connectives, that may be parsed from the text without removing its essential content describing the media image.

The non-essential word extraction subroutine is preferably a default operation for all text-containing media image files, such as text database files, digitized document files, or voice-image text files generated by the speech recognition-to-text conversion operator. However, it may be turned off for media images, such as photographs or video images, that typically contain only a limited, if any, quantity of alpha-numeric characters. Turning off the non-essential word extraction routine for such significantly reduced, or limited text content media images prevents it from excising any of the alpha-numeric characters in the text files obtained by the above-described character recognition preprocessing of such media images. In such a case, the entire contents of the character recognition-derived text image are inserted directly into the key word index field.

According to a further feature of the present invention, where imported video is accompanied by voice/speech signals, 'voice-text' images, obtained by the voice recognition and text conversion routine, may be used in combination with a transcribed text file of the deposition, so that the transcribed text file may be augmented with the time line data of the video, thereby enabling the transcribed text field to provide a text-based search and identification mechanism, that is capable of rapidly locating the exact portion of the video where a point in the testimony took place.

For this purpose, the contents of the transcribed text file and the contents of the voice-text file are correlated with one another, and thereby associated the time line indices of the video tape time line with the transcribed text file. The transcribed text file is then augmented to include time line indices of the video tape time line, so that the transcribed text file, which is derived from an essentially one hundred percent complete record of the videotaped deposition, can be used to locate both the audio contents of the video tape, and the associated video.

Pursuant to a further feature of the invention, in the course of storing a media image file, the contents of the media image file are 'hashed', so as to produce a hashing code representative of the digitized information contained in the file. This hashing code is stored in a hidden field as part of the index file. Then, whenever a file is searched, duplicate copies of the media image may be rapidly located by invoking the hash code of any located file as a search parameter.

DETAILED DESCRIPTION

Figure 1:
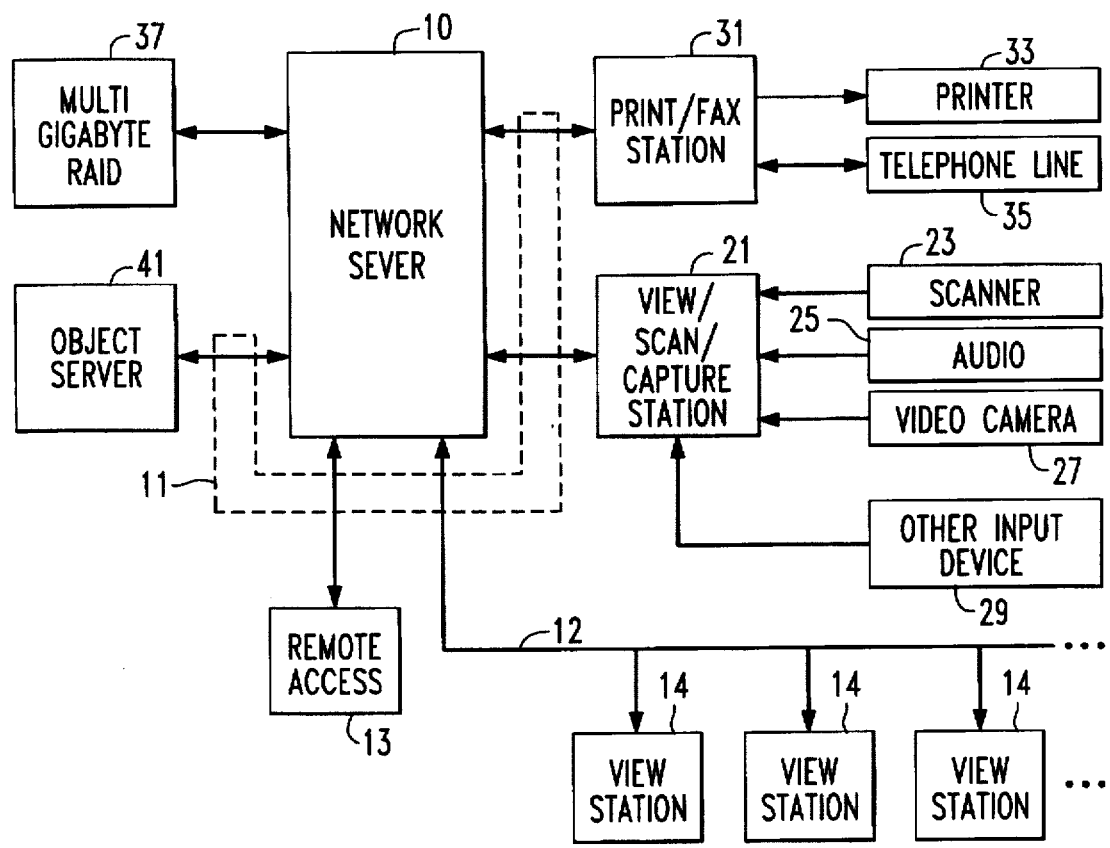
FIG. 1 diagrammatically illustrates the overall architecture of the storage and retrieval system of an embodiment of the present invention.

Before describing in detail the new and improved (media image) information storage and retrieval system in accordance with the present invention, it should be observed that the invention resides primarily in what is effectively the interfacing of conventional data storage, retrieval, reproduction and communication components, and the integration of their associated signal processing and media image manipulation control mechanisms, that are embedded in the operational control software resident in the system's integrated computer network, which enables a user of the system to both efficiently store multiple types of information, derivable from diverse media, and to rapidly access any such stored media image for reproduction on an output device.

Accordingly, the structure, control and arrangement of these conventional components and control mechanisms have been illustrated in the drawings by readily understandable block diagrams and associated processing flow charts, which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Moreover, since the details of the various commercially available programs, referenced below, are not necessary for an understanding of the present invention, they will not be described. Where specifics of any of the identified commercially available programs or hardware components employed in the system are desired, reference may be had to the supplier/manufacturer of the item of interest.

Referring now to FIG. 1, the general architecture of the storage and retrieval system of the present invention is diagrammatically illustrated as comprising a multi-level network system, including a network server processor 10, that is coupled via a local area network (LAN) 11 to various input/output and control elements of the system, to be described. Network server processor 10 operates as a system interface between one or more (local or remote) user control terminals, a media image input/output device and an attendant media image store, as will be described. As a non-limiting example, network server processor 10 may comprise an Intel processor chip-based computer (e.g. an 80486/66 MHz chip, driven by a Novell 3.12 network server program), equipped with 64 Mb of local memory, an attendant 1 GB hard drive, a 10baseT hub, and associated communication cables for the local area network. DOS 6.22 and WINDOWS 3.11 control software may be employed as the operating system program for each of the processors of the system. Database control software for the network server processor 10 may comprise a Gupta SQLBase program.

The principal media image input/output control mechanism of the system is performed through one or more local view stations 14, which are coupled via a digital communication bus 12 of the LAN 11 to the network server processor 10, so that users of the system may control the operation of the network server 10 and store and/or access data (media images) to be displayed, exported or printed. (In addition to being accessed and controlled by one or more local view stations 14, the network server 12 may also be remotely accessed via a remote access interface 13.)

Each view station 14 preferably comprises a processor-based video display terminal (VDT) having one or more input/control devices, such as a keyboard/mouse arrangement, and an associated display device (e.g. CRT), together with a network card that interfaces the view station with local area network bus 12. The (storage and retrieval) operational control program for each media image view station 14 comprises a supervisory media image manipulation and control program, such as FYI, by Identitech, into which subordinate media image manipulation programs for use with various media and media image formats are layered or embedded, so that the user has the ability to operate a variety of media image processing programs through a single, supervisory controller. Such subordinate embedded programs include an image file annotation program (e.g., provided by Spicer Imagination), that allows the user to mark-up/edit documents, an image indexing program (such as ZYIndex) that allows the user to index a media image and perform a free text search using Boolean and fuzzy logic parameters, a multiple object file viewer (such as FYIView by Identitech, or Picview by Pegasus) for controlling the importing of media images having different formats from various media image sources, and which may be supplemented by one or more auxiliary media image access programs (such as OUTSIDE IN).

For importing and storing images from different media, network server processor 10 is coupled to a view/scan/capture station processor 21. View/scan/capture station processor 21 is interfaced with a plurality of information sources, shown as including a digitizing document scanner 23, an audio input unit 25, a video camera 27 and an auxiliary input device 29 (such as a VCR, laser disc unit, digitizing still camera, and the like).

As a non-limiting example, view/scan/capture station processor 21 may comprise an Intel processor chip-based computer (e.g. a Pentium chip) together with associated Hauppage, MPEG, Xionics Turbo and Daughter cards. Also included in each view station terminal is a motion pictures expert group (MPEG) decompression card (such as an OPTIView or Reelmagic card) and a network card for interfacing the view/scan/capture station 21 with the local area network 11.

For controlling the operation of view/scan/capture station processor 21, a Hauppauge WIN/TV or Pegasus Image Capture program may be employed for media image capture, Word Scan Plus may be used for optical character recognition, OPTIView or Reelmagic control software for the corresponding MPEG decompression card, while text format processing for the document scanner may use Win-Word for Microsoft Windows. Like the other media image processing software described previously, each of the media image capture programs employed by the view/scan/capture station processor 21 is accessible through the supervisory FYI program of the user view stations.

Digitizing document scanner 23 may comprise a high speed digital scanner, such as a Fujitsu 3096EX or similar high speed scanner device. The audio input 25 may be derived from a microphone associated with video camera 27 and, as will be described, is processed by a voice recognition and text conversion correlation routine, to provide a search and identification mechanism that locates image clips in video data generated by video camera 27. As an initial processing operation, whenever audio (voice from a video camera microphone) is input via audio source 25, the voice signals are processed through a voice recognition-to-text translation routine, so as to generate a 'text image' file. Video camera 27 itself may comprise any commercially available video camera, such as one having a video output port or containing an on-board video tape cassette that may be coupled to a VCR for playback.

Also coupled to network server processor 10 is a print/fax processor station 31, which is operative to interface the network server processor 10 with a printer 33, and an external communications link (telephone line) 35 through which media image files may be input to the network server processor 10, or from which media image files from a remote terminal may be coupled into the system (e.g. transmitted by facsimile communication or electronic data transfer). As a non-limiting example, print/fax station processor 31 may comprise an Intel processor chip-based computer (such as an 80486/66 MHz chip) equipped with 16 Mb of local memory, an attendant 1 GB hard drive, a 10baseT hub, a Modem/FAX card, and associated communication cables for the local area network.

To store video data, such as that derived from video camera 27, or a video tape downloaded from a VCR as auxiliary input device 29, network server processor 10 is coupled to an attendant mass data store, shown as multi-gigabyte (e.g. a 27 GB RAID) memory 37. Network server processor 10 is further coupled to an object server processor 41, which controls access to all of the other units of the system. Like print/fax station processor 31, object server processor 41 may comprise an Intel processor chip-based computer (such as an 80486/66 MHz chip) equipped with 16 Mb of local memory, and an attendant 1 GB hard drive.

As described earlier, regardless of their type or original data format, all media inputs to the system (supplied predominantly through view/scan/capture station processor 21, but also through telecommunication interface 35), are processed to create a 'text' file for that media image, so that a free text search operator may be employed to locate a media image file, and thereby access the index file with which the text file is associated.

As pointed out above, the free text search mechanism program may comprise an off-the-shelf image indexing and text search program (such as ZYIndex), through which a user at a view station 14 may perform a free text search using Boulean and fuzzy logic parameters. By virtue of the fact that each stored media image file, regardless of its original format, is processed to generate an accompanying text file, then even with limited amounts of information about a media image, so that in the event the view station operator lacks a priori knowledge of the index search folder and its attendant description fields, he may still be able to retrieve the media image using the free text operator.

For certain types of inputs, such as a text database file received from the print/fax station processor 31, or a digitized document from the high speed scanner 23, for example, the digitized media image file is essentially a text file, upon which the free text search mechanism may obviously operate. A typical example of imported text file is that of a deposition transcript supplied from a court reporter, either via a portable storage medium (e.g. floppy disc) or, during trial, directly into the system from the court reporter's transcription terminal.

Figure 2:
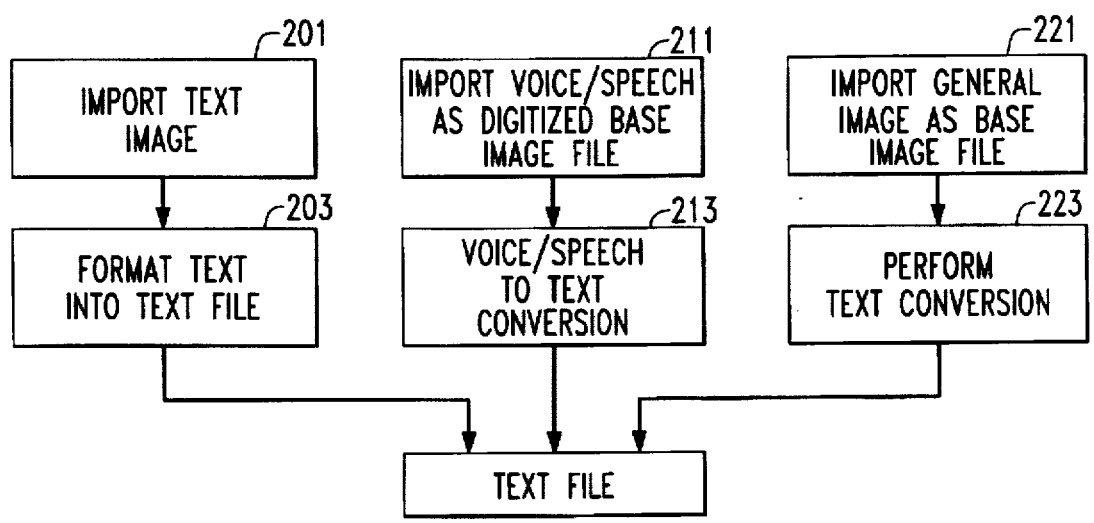
FIG. 2 is a process flow diagram illustrating the generation of media image text files in the course of importing media images from a variety of information sources.

More particularly, as shown at step 201 in the process flow diagram of FIG. 2, where the input media image file is imported from a digitally formatted source, such as an ASCII file supplied from print/fax station 31, a floppy disc or CD-ROM supplied to a respective portable database interface of view/scan/capture station 21, or the output of document scanner 23, it may be understood that at least a portion of the 'document' will contain text.

Of course, document scanner 23 could be used to scan a medium other than a document at least a portion of which contains text, such as a photograph of a group of people in which no text is visible. However, such is not the intended nor ordinary use of a (text-containing) document scanner and, for purposes of the present description, it may be presumed that the document scanner 23 is used in its customary manner to scan a text-containing document, thereby converting the contents of the scanned document into a digital text file, as shown at text format step 203, that is formatted in accordance with a prescribed word-processing program, such as the WinWord program, described above.

Since any text-containing document may include, in addition, to standard typed or printed text, other 'text'-type marks, such as a date stamp, signatures, hand notations etc., any document scanned by scanner 23 is processed through an optical character recognition operator (OCR) program, such as the Word Scan Plus software, referenced above, so that the resulting text file for the media image of interest will include not only standard typed or printed text, but all text-type markings on the document being scanned.

For general image media inputs, such as a photograph, the output of a video camera, or audio (voice) input, similar precursor text-detection processing of the original information signals is necessary to produce a 'text' image file, that will allow use of the free text search mechanism.

In the case of audio (speech/voice) signals, such as those provided by a microphone associated with video camera 27, in addition to generating a base media image file (corresponding to a digitized representation of the original audio), shown at step 211 in FIG. 2, the (mic-sensed) voice signals are also processed through a precursor voice recognition-to-text translation routine, shown at step 213, thereby producing an auxiliary base 'text image' file, that is similar to that obtained by high speed scanner 23 when it scans a text-containing document.

For this purpose, any commercially available voice recognition-to-text translation routine which achieves reasonable performance levels may be employed. Of course, the performance level may vary depending upon characteristics of the interpreted voice signals, as well as the voice detection program employed. Still, what is paramount is the fact that the resulting auxiliary voice-image file is in text format. As a result, not only can the voice-converted text file be searched individually by the free text search mechanism, but, as will be described, the contents of the voice-converted text file can be used to rapidly access video images derived from a video camera from a microphone of which the text-converted voice signals have been obtained.

It should be noted that the voice signals need not have been derived from a video camera, nor must they have associated video to be processed and retrieved. It is the processing of voice signals through a voice recognition and text translation routine to produce a 'text' image file, that enables the originally digitized and stored voice to be rapidly accessed and played back by the search and retrieve mechanism of the present invention, as will be described.

For non-text, or 'general' image media, such as photographs, the original media image scene may or may not contain a text object (such as a name tag, label, sign or other assembly of alpha numeric characters located somewhere in the media image), that can be detected by processing the image through a character recognition routine. In an attempt to determine whether an original general media image contains any text, the base image derived from the image-containing medium, such as a digitized media image obtained from a photograph that has been scanned into the system by a digitizing camera coupled to auxiliary input 29, as shown at importing step 221 in FIG. 2, is subjected to a an optical character recognition text conversion operator, as shown at step 223.

This precursor text conversion operator examines the contents of the base media image file, which is a digitized pixel map representation of the original scene and, using the above-referenced character recognition routine, searches the digitized media image file for the presence of text (one or more alpha-numeric characters) anywhere in the media image, thereby creating a secondary, 'text' file for that media image. For example, if the original medium is a photograph of an automobile having its license plate visible and at least partially readable in the scene, the text file for the photograph would contain at least the alpha-numeric characters of the license plate (and any other text present in the photographed scene).

Once such a media image has been imported, the system will now contain two associated media image files. The first or base media image file (e.g. from a photograph) is obtained as a direct result of the digitizing process carried out by the media image import mechanism in step 221; its associated secondary or text image file, resulting from the precursor text detection operator carried out in step 223, contains whatever text, if any, is contained in the original media image. If the original media image contains no text of any kind, then the text image will also contain no text, and will be identified as being 'blank text'. However, it is still a 'text' image file. If the character recognition operator has located text anywhere in the original media image, the secondary 'text' image file will contain some text (at least one alpha-numeric character).

As described briefly above, the manner in which imported media images are processed for storage in accordance with the present invention allows two alternative retrieval routines to be used to access a stored media image for playback. The first retrieval routine, termed an index search, relies upon the ability of the user to access the folder and descriptor fields within the folder where the media image has been filed, using the media image data base storage program, such as the FYI system, referenced above. As noted earlier, the second retrieval routine, termed a free text search, is intended to be used when the user does not have sufficient a priori information to access the folder and descriptor fields within the folder where the media image has been filed. Instead, it relies upon the contents of the text image file associated with the media image to be retrieved.

Figure 3:
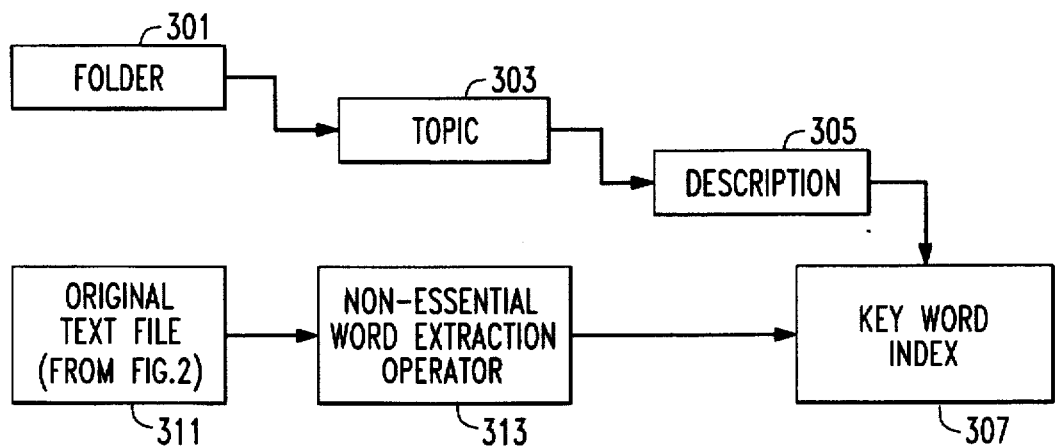
FIG. 3 diagrammatically illustrates the manner in a media image that has been imported by an import and file generation mechanisms is stored, so that it may accessed by means of an index search.

FIG. 3 diagrammatically illustrates the manner in which a media image that has been imported by any of the above described import and file generation mechanisms is stored, so that it may be accessed by means of an index search, for which an accessing user of the system has some a priori knowledge. In accordance with the index search storage routine, using an archival document storage and retrieval graphical user interface program, such as the FYI system, referenced above, via the view station keyboard and mouse devices, the user either creates a new folder or opens an already existing folder 301 in which one or more media images may be filed.

For each media image being stored within the folder 301, the user is interactively prompted to supply various identification information, such as topic 303 to which the media image relates, and a media image file description 305, such as name, date, start of the file, end of the file fields, etc. The media image file also includes a description field 307, termed a 'key word' index field. The purpose of the key word index field 307 is to both provide concise description of the media image, that facilitates an index search by a user.

Now although the contents of the key word index field can be prepared by the user, directly from keyboard of the view station 14, and may be necessary, particularly in the case of a photographic image containing little or no text, or a video image having no accompanying voice, requiring the user to create the key word index field for each imported media image is cumbersome, time consuming and relies upon the expertise of the terminal operator to select the appropriate key words. Pursuant to a time and labor saving feature of the present invention, the contents of the key word index field are initially generated by a default, non-essential word extraction subroutine, that derives the key words of the key word index field from the contents of the text file.

Pursuant to this key word field-generation subroutine of the present invention, as each 'text' image file is generated, shown at 311 in FIG. 3, it is subjected to a non-essential word extraction operation, shown at 313, which reduces the contents of the media image's text file to one or more 'key words', that are loaded into the key word index field 307, but contain no auxiliary or connecting words, such as definite or indefinite articles, prepositions and other similar textual connectives, that may be parsed from the text without removing its essential content describing the media image.

This non-essential word extraction subroutine is preferably a default operation for all text-containing media image files, such as text database files, digitized document files, or voice-image text files generated by the speech recognition-to-text conversion operator. However, it may be (selectively) turned off for media images, such as photographs or video images, that typically contain only a limited, if any, quantity of alpha-numeric characters. Turning off the non-essential word extraction routine for such significantly reduced, or limited text content media images prevents it from excising any of the alpha-numeric characters in the text files obtained by the above-described character recognition preprocessing of such media images. In this case, the entire contents of the character recognition-derived text image are inserted directly into the key word index field 307.

As noted previously, for limited text content media images, it can be expected that the view station operator will augment the contents of the key word index field, if any text is present. Still, the amount of additional information to be inserted into the key word index field is an option of the operator. Obviously, a blank text file would produce and blank or empty key word index field, and require the operator to examine the media image (displayed on the view station monitor) and insert appropriate key words into the key word index field. On the other hand, if the contents of the key word index field's default entry are determined by the operator to be sufficient, the entry may be simply accepted as a complete. Thus, where the original media image contains sufficient text to adequately provide a key word description, it is unnecessary for the operator to spend time generating or augmenting the key word index field, thereby reducing the time and manpower required to assemble the media image file's index folder.

As described earlier, pursuant to an additional feature of the present invention, where imported video is accompanied by voice/speech signals (for example, a videotaped deposition will contain both video showing the participants during the deposition, and accompanying voice/speech of the questions and answers of the videotaped participants), the 'voice-text' images, obtained by the voice recognition and text conversion routine, may be used in combination with a transcribed text file of the deposition, so as to enable the transcribed text file to be augmented with the time line data of the video, thereby enabling the transcribed text field to provide a text-based search and identification mechanism, that is capable of rapidly locating the exact portion of the video where a point in the conversation (e.g. testimony) of interest took place.

Namely, the problem being addressed is how to quickly and precisely retrieve video tape images and accompanying testimony associated with those media images, where accompanying testimony (voice/speech) has been recorded (as by way of a court reporter transcript) separate from the video tape.

One mechanism that has been proposed to solve the voice—video alignment problem, per se, is described in the Ardis et al, U.S. Pat. No. 5,172,281, entitled: "Video Transcript Retriever," issued Dec. 15, 1992. According to this patented scheme, an auxiliary time line generator is used to place timing indices on the court reporter's transcript tape, that may be matched with those of the video tape. These time indices are then relied upon to assign a given portion of the transcript with a corresponding time index portion of the video tape.

A fundamental problem with this approach is that it does not address the issue of the waiting time for the video tape to be transported from one location to another. Secondly, the system must operate in real time, so that the transcript time line will track that of the video tape.

Figure 4:
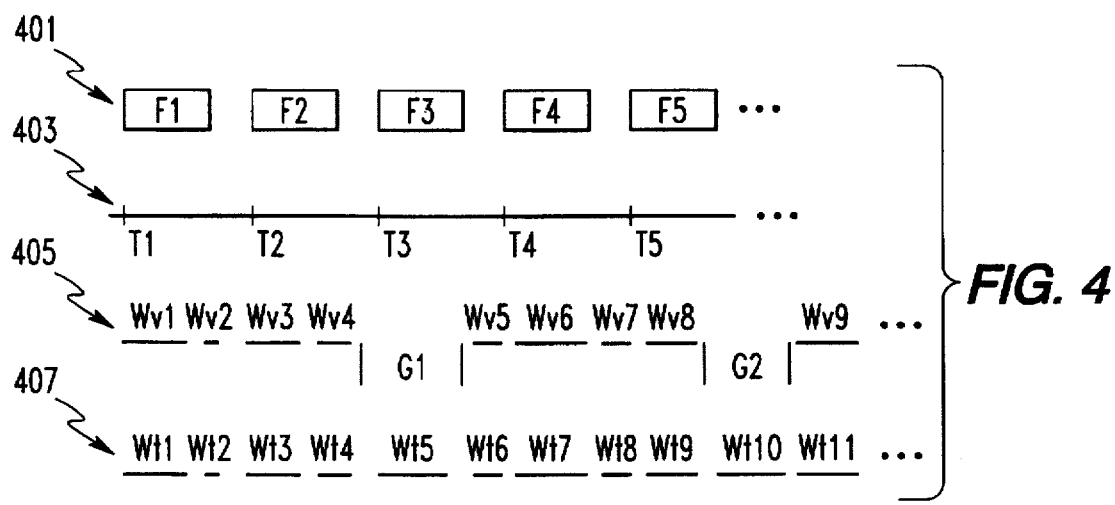
FIG. 4 is a timing diagram of the relationship among video tape image frames, a time line containing a time index track associated with the (recorded video and audio) contents of the video tape, successive words of voice-text of the video tape as derived from a speech recognition-to-text conversion operator, and successive words of text of the video tape, as derived from a court reporter transcription.

The search and identification mechanism of the present invention, which avoids the problem of mechanical tape transport and need not be carried out in real time, as in the Ardis et al patent, may be understood by reference to the temporal relationship diagram of FIG. 4. In the Figure, line 401 represents a sequence of video image frames (F1, F2, F3, F4, F5, ...) of the imported video (such as that provided from a video tape of a deposition). Line 403 shows a time line containing a time index track (T1, T2, T3, T4, T5, ... associated with the (recorded video and audio) contents of the video tape. Line 405 represents successive words (Wv1, Wv2, Wv3, ..., Wv9, ...) of the voice-text of the video taped conversation, as derived from a speech recognition-to-text conversion operator, as described above, and line 407 represents successive words (Wt1, Wt2, Wt3, ...., Wt11, ...) of transcribed text derived from a court reporter transcription of the video taped deposition.

It should be noted that line 405 has a voice-text gap G1, that falls between word Wv4 and word Wv5, and a voice-text gap G2, that falls between word Wv8 and word Wv9. These voice-text gaps are due to the less than one hundred percent performance capability of current commercially available speech recognition-to-text conversion operators to accommodate any individual's speech characteristics—inflection, tone, dialect, slurring, mumbling, etc. As speech analysis technology improves to the point where speech recognition-to-text conversion operator produces no gaps, and enjoys an accuracy compatible with that produced by a human transcriber, the transcription text will become superfluous, and any portion of the video can be located by a free text search of the converted voice-text file. However, because of this performance limitation of currently commercially available speech recognition-to-text conversion operators, the voice-text file cannot be relied upon to search either the voice contents of the deposition, of its video content.

Figure 5:
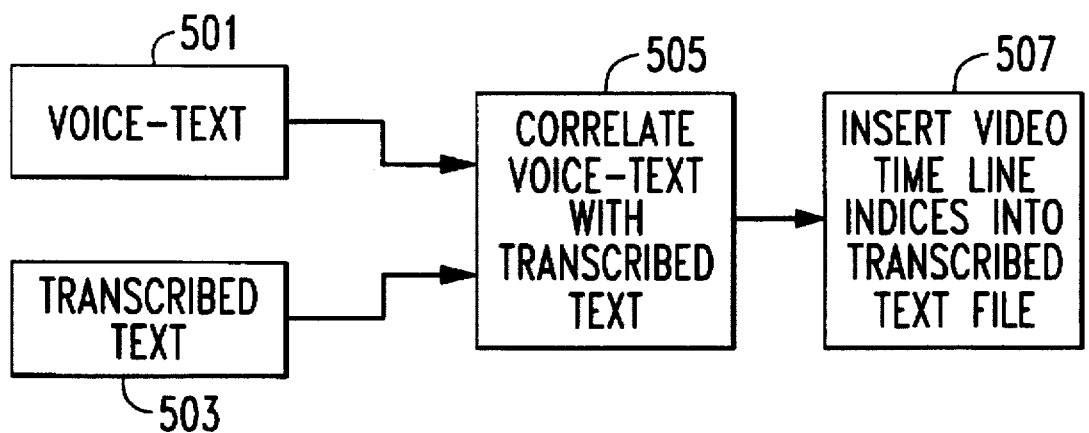
FIG. 5 shows a correlation operation through which the contents of a transcribed text file and the contents of a voice-text file are correlated with one another to provide an association between time line indices of a video tape time line with a transcribed text file.

As shown in FIG. 5, to remedy this problem, the contents of the transcribed text file (successive words $Wt1$, $Wt2$, $Wt3$, ..., $Wtl$, ... of which are shown in line 407 of FIG. 4), and the contents of the voice-text file (successive words $Wv1$, $Wv2$, $Wv3$, ..., $Wv9$ of which are shown in line 405 in FIG. 4), are coupled as respective inputs 501 and 503 to a correlator 505, which associates the time line indices ($T1$, $T2$, $T3$, ..., in line 403 of FIG. 4) of the video tape time line with the transcribed text file. In step 507, the transcribed text file is augmented to include time line indices of the video tape time line, so that the transcribed text file, which is derived from an essentially a one hundred percent complete record of the videotaped deposition, can be used to locate both the audio contents of the video tape, and the associated video.

In the above description, it has been assumed that both the video and audio signal were derived from the operation of a video camera, in which the video images and the voice signals are customarily stored on the same magnetic tape, so that they share a common time line on the tape. In the alternative, where video and voice are obtained through separate camera and microphone recording components, there are standard synchronization mechanisms for ensuring a common or mutual time line for the two sets of recordings.

It will be appreciated that the above-described correlation of the contents of the transcribed text file with the contents of the voice-text file, which associates the time line indices of the video tape time line with the transcribed text file, so that the transcribed text file can be used to rapidly locate both the audio contents of the video taped conversation and the associated video from a mass storage database, offers a significant improvement over the conventional process of repetitively performing a time-consuming series of fast forward, look, and rewind operations of a video cassette recorder (VCR). It should also be noted that this voice-text database correlation mechanism need not operate in real time with the operation of the video camera, but can be, and is customarily, operated off-line after the video taping session is finished.

Figure 6:
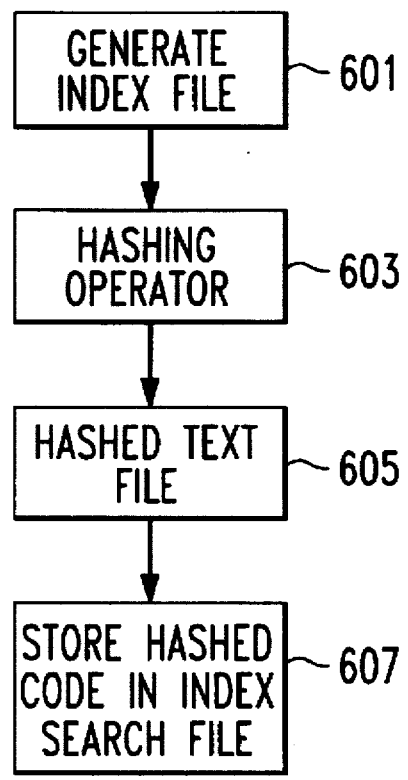
FIG. 6 is a flow diagram illustrating a hashing operation, through which the contents of the digitized media image contained in the index file are processed through a numerical compression algorithm (hashed) to produce a hashing code, representative of the media image.

Pursuant to a further feature of the invention, diagrammatically shown in the flow diagram of FIG. 6, each respective media image stored in an index file, as shown at 601, it is subjected to a 'hashing' operation, shown at 603. Namely, the contents of the digitized media image contained in the index file are processed through a numerical compression (hashing) algorithm, such as that customarily employed in data and signal processing systems, to produce a hashing code, shown at 605, representative of the media image. This hashing code is stored in a hidden field as part of the index file, as shown at 607. Then, whenever a file is searched, duplicate copies of the stored media image may be rapidly located by invoking the hash code of any located file as a search parameter.

Thus, for example, the same document may be stored under a plurality of different index file identifiers. Once any of these documents has been retrieved by either an index search or a free text search, whether any other copy of the accessed document exists may be quickly determined by use of the hash code embedded in the accessed file. Namely, the inclusion of the hash code speeds up the search query, since the search comparator needs only to look for a hash code match.

As will be appreciated from the foregoing description, the present invention provides an integrated information storage and retrieval system, having a single graphical user interface through which data obtained from diverse types of media image generation equipments are converted to both a user-defined storage index format and a supplemental text description-based format, so as to facilitate rapid retrieval of any type of data, regardless of its original format (e.g. text, picture, text-picture combination, video, audio) and regardless of the capture medium or source from which it is imported into the system.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of processing information contained in different types of media, comprising the steps of:
   (a) processing each and every of said different types of media by storing in memory a first, index storage file, which contains a text description of the contents of information contained in said any medium, and an identification of said first, index storage file; and
   (b) for each respective medium processed in step (a), analyzing the contents of information of said respective medium, regardless of the type of the subject matter of said contents of information, for the presence of text, and generating a second, text file, that contains all text found in said medium and storing said second, text file in memory in association with said first, index storage file; and wherein said respective medium comprises a video recording medium containing video and voice information signals associated with a video recorded activity, and a further medium containing a separate transcription of said voice information, and wherein step (b) comprises processing said voice information signals through an automated voice recognition-to-text conversion mechanism, so as to generate a voice-converted text file, and processing said further medium containing said separate transcription of said voice information to generate a transcribed voice text file, and correlating successive words of said voice-converted text file and successive words of said transcribed voice text file to associate contents of said transcribed voice text file with said video information.

2. A method according to claim 1, wherein said video information contains time line information, and wherein step (b) comprises correlating said successive words of said voice-converted text file with said successive words of said transcribed voice text file to associate said time line information of said video information with said transcribed voice text file, and storing said time line information as part of said transcribed text file.

3. A method according to claim 2, further including the step (c) retrieving video information associated with a transcribed text file by searching said time line information of said transcribed text file.

4. A method of processing information supplied by way of a different types of media, comprising the steps of:
  (a) for any medium of said different types of media, generating a first, index storage file, which contains information contained in said any medium, an identification of said first, index storage file and a text description of the contents of the information contained in said any medium, and storing said first, index storage file in memory; and
  (b) for said any medium, analyzing said information contained therein, regardless of the type of the subject matter of said information, for the presence of text-type information, and generating a second, text file, that contains all text-type information detected to be present in the analyzed information, and storing said second, text file in memory in association with said index storage file; and
  wherein said any medium comprises a video recording medium containing video and voice information signals associated with a video recorded activity, and a further medium containing a separate transcription of said voice information, and wherein
  step (b) comprises processing said voice information signals through an automated voice recognition-to-text conversion mechanism, so as to generate a voice-converted text file, and processing said further medium containing said separate transcription of said voice information to generate a transcribed voice text file, and correlating successive words of said voice-converted text file and successive words of said transcribed voice text file to associate contents of said transcribed voice text file with said video information.

5. A method according to claim 4, wherein said video information contains time line information, and wherein step (b) comprises correlating said successive words of said voice-converted text file with said successive words of said transcribed voice text file to associate said time line information of said video information with words of said transcribed voice text file, and storing said time line information as part of said transcribed text file.

6. A method according to claim 5, further including the step (c) retrieving video information associated with a transcribed text file by searching said time line information of said transcribed text file.

7. A system for processing information supplied by way of a different types of media, comprising:
  an image capture station to which said different types of media are coupled and which is operative to generate a digitized representation of information contained in any medium coupled thereto;
  memory in which digitized image files are storable; and
  an information processor, which is coupled with said image capture station and is operative to generate a first, index storage file, which contains information contained in said any medium, an identification of said first, index storage file, and a text description of the contents of the information contained in said any medium, and which is operative to store said index storage file in said memory, and wherein said information processor is further operative to analyze said information contained in said any medium regardless of the type of the subject matter of said information, for the presence of text-type information, and to generate a second, text file, that contains all text-type information detected to be present in the analyzed information, and stores said second, text file in said memory in association with said index storage file; and wherein
  said any medium comprises a video recording medium containing video and voice information signals associated with a video recorded activity, and a further medium containing a separate transcription of said voice information, and wherein
  said information processor includes an automated voice recognition-to-text conversion mechanism which converts said voice information signals to a voice-converted text file, processes said further medium containing said separate transcription of said voice information to generate a transcribed voice text file, and correlates successive words of said voice-converted text file and successive words of said transcribed voice text file so as to associate contents of said transcribed voice text file with said video information.

8. A system according to claim 7, wherein said video information contains time line information, and wherein said information processor is operative to correlate said successive words of said voice-converted text file with said successive words of said transcribed voice text file to associate said time line information of said video information with words of said transcribed voice text file, and to store said time line information as part of said transcribed text file.

9. A system according to claim 8, further including an image retrieval mechanism which is operative to retrieve video information associated with a transcribed text file by searching said time line information of said transcribed text file.

10. A system for processing information supplied by way of a different types of media, comprising a processor-based network server, which operates as a system interface between one or more user control terminals, an image capture station through which image input/output devices are coupled to said network server, and a memory for storing image files to be retrieved for reproduction on a reproduction device, said network server operating in accordance with a supervisory image manipulation and control program, accessible by means of a supervisory graphical user interface at any user control terminal, said supervisory image manipulation and control program having embedded subordinate image manipulation programs for different types of media and information formats thereof, said supervisory image manipulation and control program being operative to generate a first, index storage file, which contains information contained in any of said different type of media, an identification of said first, index storage file, and a text description of the contents of the information contained in said any of said different type of media, and is operative to store said index storage file in said memory, and to analyze said information contained in said any of said different type of media, regardless of the type of the subject matter of said information, for the presence of text-type information, and to generate a second, text file, that contains all text-type information detected to be present in the analyzed information, and stores said second, text file in said memory in association with said index storage file, and wherein said image capture station is coupled to import video and voice information signals associated with a video recorded activity from a video recording medium, and a separate transcription of said voice information on a further medium, and wherein said image capture station includes an automated voice recognition-to-text conversion mechanism which converts said voice information signals to a voice-converted text file, and wherein said supervisory image manipulation and control program is operative to correlate successive words of said voice-converted text file and successive words of said transcribed voice text file so as to associate contents of said transcribed voice text file with said video information.

11. A system according to claim 10, wherein said video information contains time line information, and wherein said supervisory image manipulation and control program is operative to correlate said successive words of said voice-converted text file with successive words of said transcribed voice text file to associate said time line information of said video information with said transcribed voice text file, and to store said time line information as part of said transcribed text file.

12. A system according to claim 11, wherein said supervisory image manipulation and control program is operative to retrieve video information associated with a transcribed text file by searching said time line information of said transcribed text file.

* * * * *